United States Patent [19]
Park et al.

[11] Patent Number: 5,887,113
[45] Date of Patent: Mar. 23, 1999

[54] APPARATUS AND METHOD FOR CONTROLLING TRACKING IN SLOW MODE PLAYBACK

[75] Inventors: Man Sik Park, Kyungki-Do; Yong Jae Kim, Inchon, both of Rep. of Korea

[73] Assignee: Goldstar Co., Ltd., Seoul, Rep. of Korea

[21] Appl. No.: 741,097

[22] Filed: Oct. 30, 1996

Related U.S. Application Data

[63] Continuation of Ser. No. 293,182, Aug. 19, 1994, abandoned.

[30] Foreign Application Priority Data

Aug. 26, 1993 [KR] Rep. of Korea ............... 1993-16681
Mar. 29, 1994 [KR] Rep. of Korea ............... 1994-6370

[51] Int. Cl.$^6$ .................................................. H04N 5/91
[52] U.S. Cl. ............................... 386/81; 386/78; 386/76
[58] Field of Search .................... 360/10.2, 10.3, 360/73.12, 77, 13, 10.1, 77.15, 77.16; 386/68, 76, 78, 79, 80, 81, 113, 114

[56] References Cited

U.S. PATENT DOCUMENTS

| | | | |
|---|---|---|---|
| 4,737,864 | 4/1988 | Sekiya et al. ..................... | 360/10.3 |
| 4,912,571 | 3/1990 | Sekiya et al. ..................... | 360/10.3 |
| 5,031,051 | 7/1991 | Kim ..................................... | 386/68 |
| 5,107,381 | 4/1992 | Mitsuhashi et al. ............. | 360/77.13 X |
| 5,289,323 | 2/1994 | Traka et al. ....................... | 360/77.13 |
| 5,384,642 | 1/1995 | Sim ..................................... | 358/336 |

OTHER PUBLICATIONS

Japanes Patent Abstract vol. 14 No. 51, "Magnetic Recording and Reproducing Device", Jan. 30, 1990.

*Primary Examiner*—Andrew L. Sniezek

[57] ABSTRACT

An apparatus and a method of controlling tracking in slow mode playback. The tracking control apparatus comprises a video head for detecting a video signal recorded on a magnetic tape, a video signal processing circuit for detecting envelopes of the detected video signal from the video head, a microcomputer for outputting servo data and a slow tracking signal in response to the detected envelopes from the video signal processing circuit, a servo device for outputting a capstan phase control signal in response to the servo data from the microcomputer, and a capstan motor for driving a capstan in response to a signal into which the capstan phase control signal from the servo device and the slow tracking signal from the microcomputer are combined.

24 Claims, 6 Drawing Sheets

APPARATUS AND METHOD FOR CONTROLLING TRACKING IN SLOW MODE PLAYBACK

This application is a continuation continuation-in-part, of application Ser. No. 08/293,182 filed on Aug. 19, 1994, now abandoned.

BACKGROUND OF THE INVENTION

1. Field of the Invention

The present invention relates in general to controlling tracking in slow mode playback of a video cassette recorder (VCR), and more particularly to an apparatus and a method for controlling tracking in a slow mode playback in which a tracking error is automatically controlled when it generates a noise on a screen in the slow mode playback, so that an optimal picture state can be obtained.

2. Description of the Prior Art

Generally, a video signal is recorded on the tracks of a magnetic tape by a magnetic head and the recorded video signal is played back as the tracks of the magnetic tape are traced by the magnetic head. At this time, the tracks of the magnetic tape must accurately be traced by the magnetic head, which is called tracking.

Figure 1:
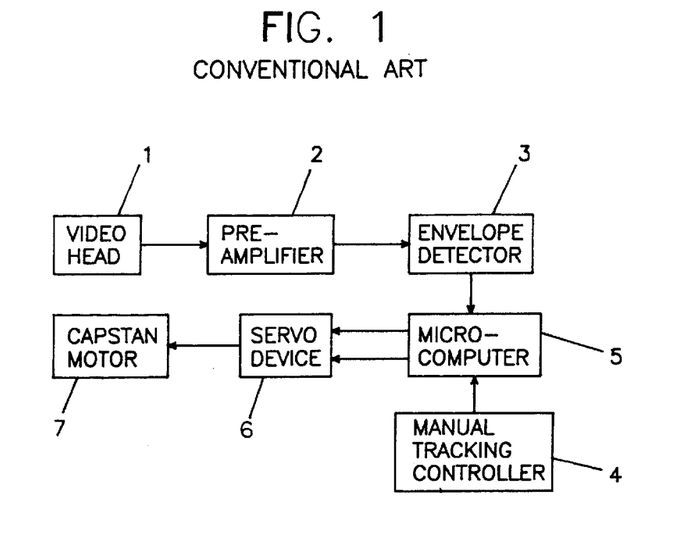
FIG. 1 is a block diagram of a conventional apparatus for controlling tracking in a slow mode playback.

Referring to FIG. 1, there is shown a block diagram of a conventional apparatus for controlling tracking in a slow mode playback. As shown in this drawing, the conventional tracking control apparatus comprises a video head 1 for detecting a video signal recorded on a magnetic tape, a pre-amplifier 2 for amplifying the detected video signal from the video head 1 by a predetermined level, an envelope detector 3 for converting an output signal from the pre-amplifier 2 into a direct current (DC) voltage and outputting the converted DC voltage to a microcomputer 5, and a manual tracking controller 4 for outputting a tracking control signal to the microcomputer 5 in response to a key input signal from the user.

The microcomputer 5 is adapted to output a servo control signal in response to the DC voltage from the envelope detector 3 and the tracking control signal from the manual tracking controller 4.

The conventional tracking control apparatus also comprises a servo device 6 for outputting a capstan phase control signal in response to the servo control signal from the microcomputer 5, and a capstan motor 7 for driving a capstan in response to the capstan phase control signal from the servo device 6.

The conventional tracking control apparatus with the above-mentioned construction is adapted to play back the video signal recorded on the magnetic tape in a slow mode by repeatedly performing normal-speed playback—still playback—normal-speed playback—still playback, as will hereinafter be described in detail with reference to. FIGS. 5A to 5D, which are waveform diagrams of the signals from the components shown in FIG. 1.

Figure 2:
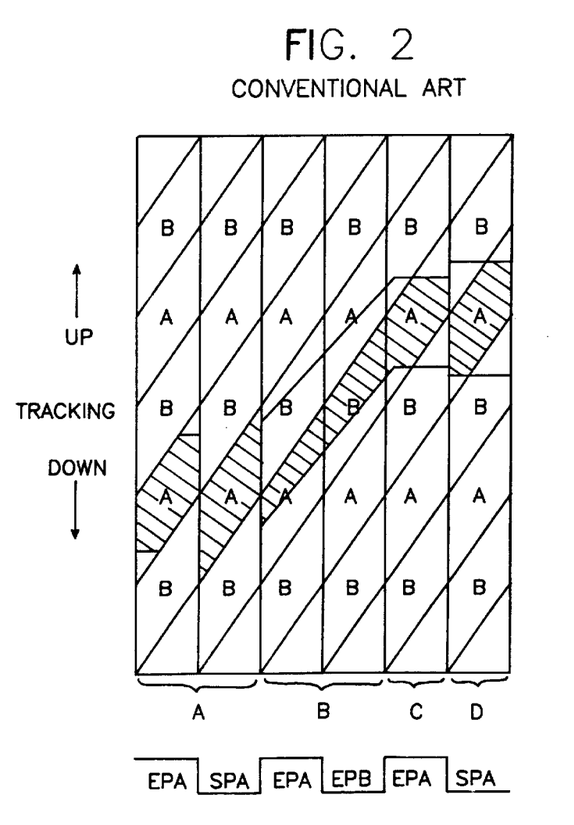
FIG. 2 is a view illustrating the trace of a video head shown in FIG. 1 in the slow mode playback.
Figures 5A, 5B, 5C, 5D:
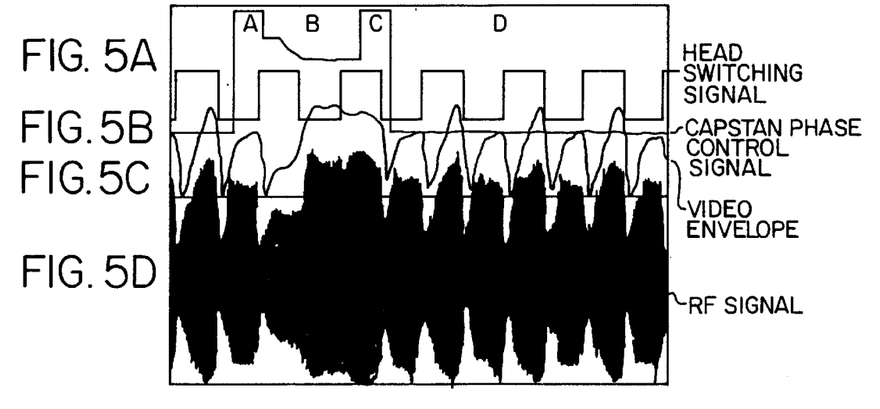
FIGS. 5A to 5D are waveform diagrams of signals generated from the components shown in FIG. 1.

First, upon receiving the capstan phase control signal from the servo device 6 as shown in FIG. 5A, the capstan motor 7 performs repeatedly an acceleration traveling (interval A in FIG. 5A), a normal-speed traveling (interval B in FIG. 5A) and a deceleration traveling (interval C in FIG. 5A). At this time, the video head 1 traces the magnetic tape as shown in FIG. 2. In FIG. 2, the playback enters from the still mode into the normal-speed mode in an interval A. The normal-speed playback is performed in an interval B. The playback is changed from the normal-speed mode to the still mode in an interval C. The still playback is performed in an interval D. In this manner, the video signal recorded on the magnetic tape is detected by the video head 1 as shown in FIG. 5D and then applied to the pre-amplifier 2. The pre-amplifier 2 amplifies the detected video signal from the video head 1 by the predetermined level and outputs the amplified video signal to the envelope detector 3. The envelope detector 3 detects an envelope of the amplified video signal from the pre-amplifier 2 as shown in FIG. 5C. Then, the envelope detector 3 converts the detected envelope into the DC voltage and outputs the converted DC voltage to the microcomputer 5. Here, a head switching signal, as shown in FIG. 5B, is a reference signal of the system.

The microcomputer 5 outputs the servo control signal to the servo device 6 in response to the DC voltage from the envelope detector 3. The servo device 6 outputs the capstan phase control signal to the capstan motor 7 in response to the servo control signal from the microcomputer 5 to control a phase of the capstan motor 7, so as to make the tracking accurate.

On the other hand, in the case where a noise is generated on the screen in the slow mode playback, the user applies a control signal to the manual tracking controller 4 using a remote controller (not shown). The manual tracking controller 4 outputs the tracking control signal to the microcomputer 5 in response to the control signal from the user. Upon receiving the tracking control signal from the manual tracking controller 4, the microcomputer 5 outputs the resultant servo control signal to the servo device 6, thereby causing the tracking to be controlled.

However, in the above-mentioned conventional tracking control apparatus, the capstan phase control signal which is applied to the capstan motor 7 in the slow mode playback is controlled as shown in FIG. 5A by a predetermined program of the microcomputer 5. For this reason, the user must manually control the tracking using a tracking control key when a noise is generated of the noise on the screen. This causes an inconvenience to the user.

SUMMARY OF THE INVENTION

Therefore, the present invention has been made in view of the above problem, and it is an object of the present invention to provide an apparatus and a method for controlling tracking in slow mode playback in which a tracking error is automatically controlled in the slow mode playback, so that an optimal picture state can be obtained.

In accordance with one aspect of the present invention, there is provided an apparatus for controlling tracking in slow mode playback, comprising a video head for detecting a video signal recorded on a magnetic tape; video signal processing means for detecting envelopes of the detected video signal from said video head; control means for outputting servo data and a slow tracking signal in response to the detected envelopes from said video signal processing means;. servo means for outputting a capstan phase control signal in response to the servo data from said control means; and a capstan motor for driving a capstan in response to a signal into which the capstan phase control signal from said servo means and the slow tracking signal from said control means are combined.

In accordance with another aspect of the present invention, there is provided a method of controlling tracking in slow mode playback, comprising the steps of (a) checking. whether a current playback mode is a slow mode, obtaining a desired number of samples of envelopes of a video signal for a desired interval of a head switching signal inputted after detection of a deceleration interval of a capstan phase control signal if it is checked that the current playback mode is the slow mode and detecting a minimum one of the obtained samples; (b) storing the detected minimum value, advancing an automatic tracking operation by one step, again performing the above procedure to detect another minimum value and comparing the detected minimum values with each other; and (c) repeatedly performing the above procedure if the currently detected minimum value is greater than the previously detected minimum value, stopping the above procedure if the currently detected minimum value is not greater than the previously detected minimum value and then outputting a maximum one of the detected minimum values as an optimal tracking value.

In accordance with still another aspect of the present invention, there is provided a method of controlling tracking in slow mode playback, comprising the steps of (a) summing envelopes of a video signal for a period of a head switching signal; (b) comparing the summed value with a previously summed value and automatically controlling slow tracking data if a difference therebetween is above a predetermined value in accordance with the compared result, to detect an optimal tracking point; and (c) performing a calculation operation with respect to a tracking value changed in a normal playback, an initial tracking value in the normal playback, and an initial slow tracking value, if the optimal tracking point is detected, in order to obtain a slow tracking signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 3:
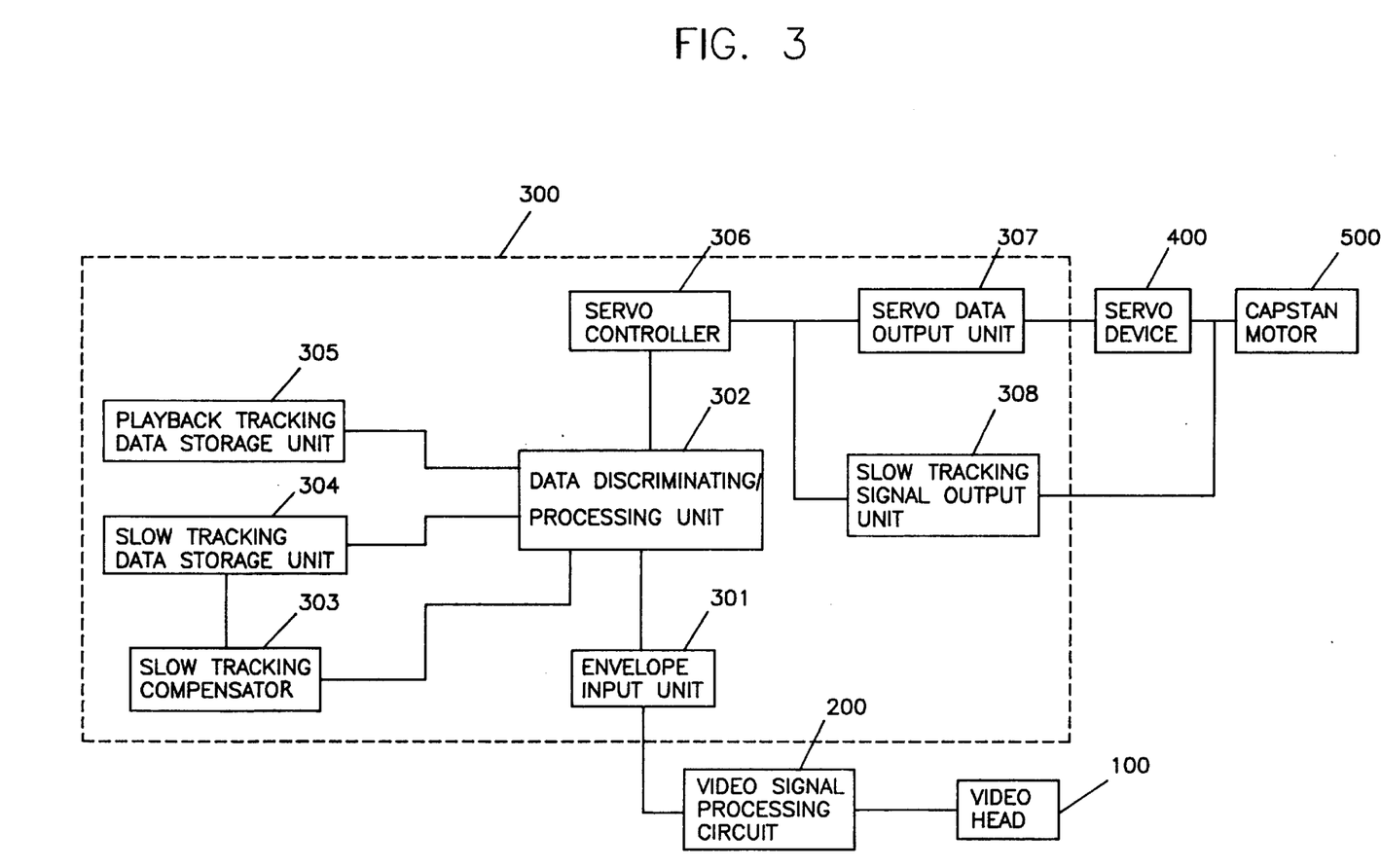
FIG. 3 is a block diagram of an apparatus for controlling the tracking in a slow mode playback in accordance with the embodiments of present invention.

Referring to FIG. 3, there is shown a block diagram of an apparatus for controlling tracking in a slow mode playback in accordance with the present invention. As shown in this drawing, the tracking control apparatus comprises a video head 100 for detecting a video signal recorded on a magnetic tape, and a video signal processing circuit 200 for detecting envelopes of the detected video signal from the video head 100, converting the detected envelopes into a DC voltage and outputting the converted DC voltage to a microcomputer 300.

The microcomputer 300 is adapted to output servo data and a slow tracking signal in response to the DC voltage from the video signal processing circuit 200.

Also, the tracking control apparatus comprises a servo device 400 for outputting a capstan phase control signal in response to the servo data from the microcomputer 300, and a capstan motor 500 for driving a capstan in response to a signal into which the capstan phase control signal from the servo device 400 and the slow tracking signal from the microcomputer 300 are combined.

The microcomputer 300 includes an envelope input unit 301 for inputting the envelopes of the video signal from the video signal processing circuit 200, and a data discriminating/processing unit 302 for summing the envelopes inputted by the envelope input unit 301 for a period of a head switching signal as a system reference signal, comparing the summed value with a previously summed value, and automatically controlling slow tracking data, if the difference between the summed value is above a predetermined value in accordance with the compared result, to search for an optimal tracking point.

Also, the microcomputer 300 includes a normal tracking data storage unit 305 for storing tracking data in a normal playback mode, a slow tracking compensator 303 for compensating for the slow tracking data controlled by the data discriminating/processing unit 302, a slow tracking data storage unit 304 for storing the slow tracking data compensated by the slow tracking compensator 303, a servo controller 306 for outputting a control signal for phase control of the capstan motor 500 in response to the controlled slow tracking data from the data discriminating/processing unit 302, a servo data output unit 307 for outputting the servo data to the servo device 400 in response to the control signal from the servo controller 306, and a slow tracking signal output unit 308 for outputting the slow tracking signal to the capstan motor 506 in response to the control signal from the servo controller 306.

Figure 4A:
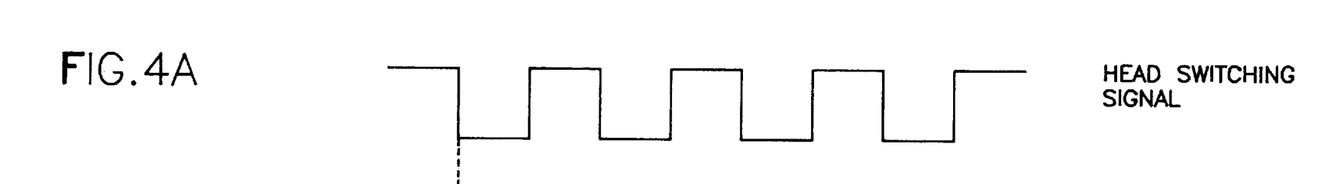
FIGS. 4A to 4C are waveform diagrams of signals generated from the components shown in FIG. 3.
Figure 4B:
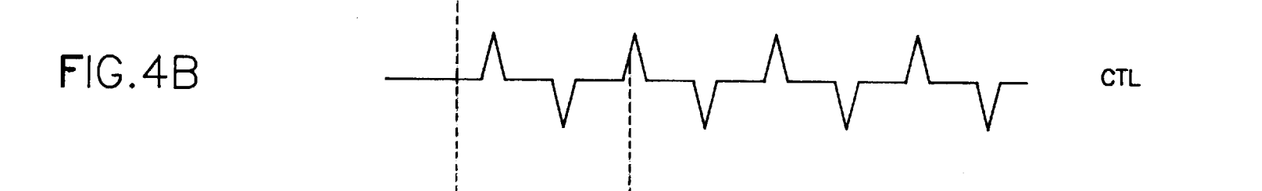

The operation of the tracking control apparatus with the above-mentioned construction in accordance with the present invention will hereinafter be described in detail with reference to FIGS. 4A to 4C which are waveform diagrams of the signals generated from the components shown in FIG. 3.

First, the video signal recorded on the magnetic tape is detected by the video head 100, amplified and then applied to the video signal processing circuit 200. The video signal processing circuit 200 detects the envelopes of the detected video signal from the video head 100. Then, the video signal processing circuit 200 converts the detected envelopes into the DC voltage and outputs the converted DC voltage to the envelope input unit 301 in the microcomputer 300. In the microcomputer 300, the data discriminating/processing unit 302 sums the envelopes inputted by the envelope input unit 301 for a period of the head switching signal as the system reference signal. The data discriminating/processing unit 302 then compares the summed value with the previously summed value. If the difference between the two values is above a predetermined value as a result of the comparison, a tracking value Pc (i.e., a tracking value changed in the normal playback) corresponding to the maximum envelope point is stored and the stored tracking value Pc, an initial tracking value Pi in the normal playback, and an initial slow tracking value Si are used to calculate an optimal interval (X) of the slow tracking signal. Therefore, the data discriminating/processing unit 302 automatically controls the slow tracking data to change the tracking point.

The servo controller 306 outputs the control signal for the phase control of the capstan motor 500 to the servo data output unit 307 and the slow tracking signal output unit 308 in response to the controlled slow tracking data from the data discriminating/processing unit 302. In response to the control signal from the servo controller 306, the servo data output unit 307 outputs the servo data to the servo device 400, thereby causing the servo device 400 to output the capstan phase control signal to the capstan motor 500 in intervals a and c in FIG. 4C. Also in response to the control signal from the servo controller 306, the slow tracking signal output unit 308 outputs the slow tracking signal to the capstan motor 500 in an interval b in FIG. 4C.

Figure 4C:
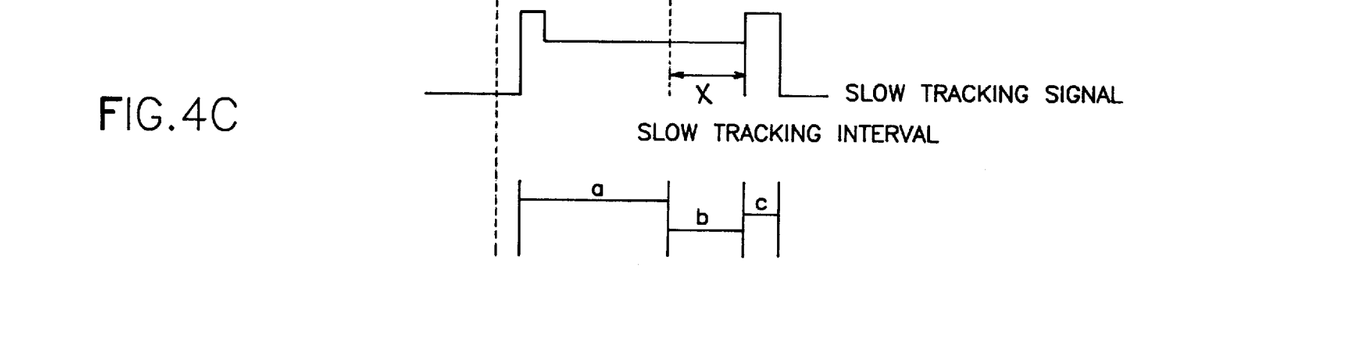

Therefore, the capstan motor 500 is controlled according to the signal, as shown in FIG. 4C, into which the capstan phase control signal from the servo device 400 and the slow tracking signal from the microcomputer 300 are combined.

In the process of combining the above two signals, the first half (interval a in FIG. 4C) of the capstan phase control signal is first outputted under the control of the servo controller 306. The slow tracking signal is then outputted under the control of the servo controller 306 upon detecting a control signal CTL which is recorded on a lower portion of the magnetic tape. Then, a still pulse of the capstan phase control signal is outputted under the control of the servo controller 306. Here, the interval (X) of the slow tracking signal can be obtained by the following equation (1):

$$X = Si + (Pc - Pi) \quad (1)$$

where, Si is the initial slow tracking value, Pc is the tracking value changed in the normal playback and Pi is the initial tracking value in the normal playback.

Namely, the still pulse of the capstan phase control signal is outputted after the lapse of the slow tracking interval (X) from the moment that the control signal CTL is detected after the first half of the capstan phase control signal is outputted, thereby causing the phase of the capstan motor 500 to be controlled.

On the other hand, upon completion of the automatic tracking operation in the slow mode playback, the slow tracking compensator 303 compensates for the slow tracking data by comparing it with the initial slow tracking value. The compensated slow tracking data from the slow tracking compensator 303 is stored into the slow tracking data storage unit 304.

Figures 6A, 6B, 6C, 6D:
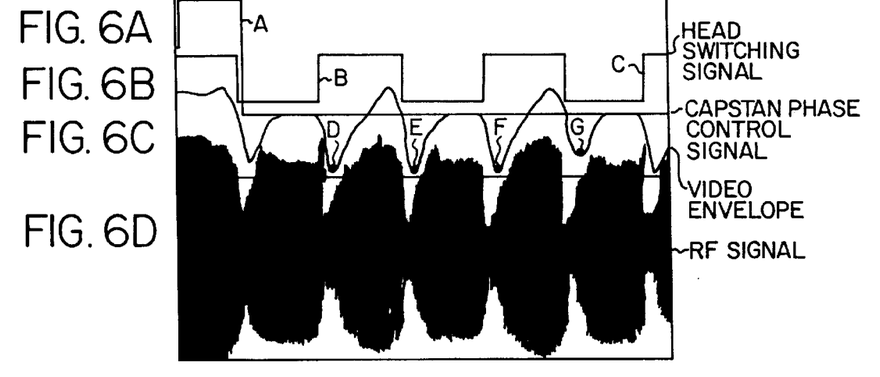
FIGS. 6A to 6D are waveform diagrams of signals in a still interval at an optimal slow mode playback state in accordance with the embodiments of the present invention.
Figures 7A, 7B:
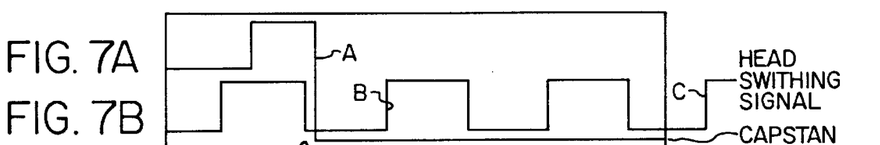
FIGS. 7A to 7D are waveform diagrams of the signals in the still interval in accordance with the present invention under the condition that a noise is generated from an upper portion of a screen.
Figures 7C, 7D:
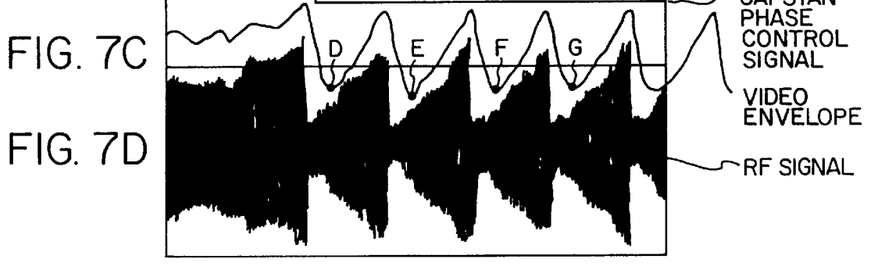
Figures 8A, 8B:
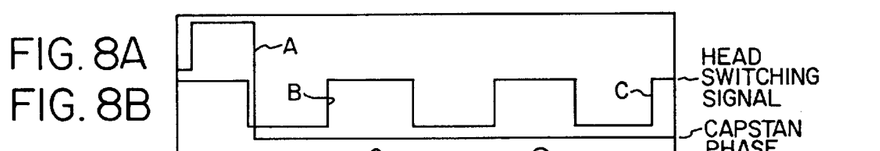
FIGS. 8A to 8D are waveform diagrams of the signals in the still interval in accordance with the present invention under the condition that a noise is generated from a lower portion of a screen.
Figures 8C, 8D:
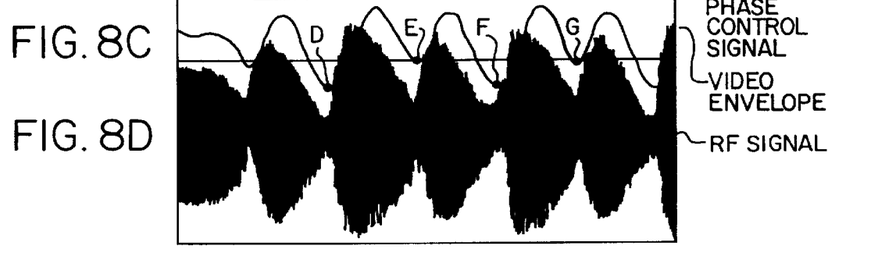
Figure 9:
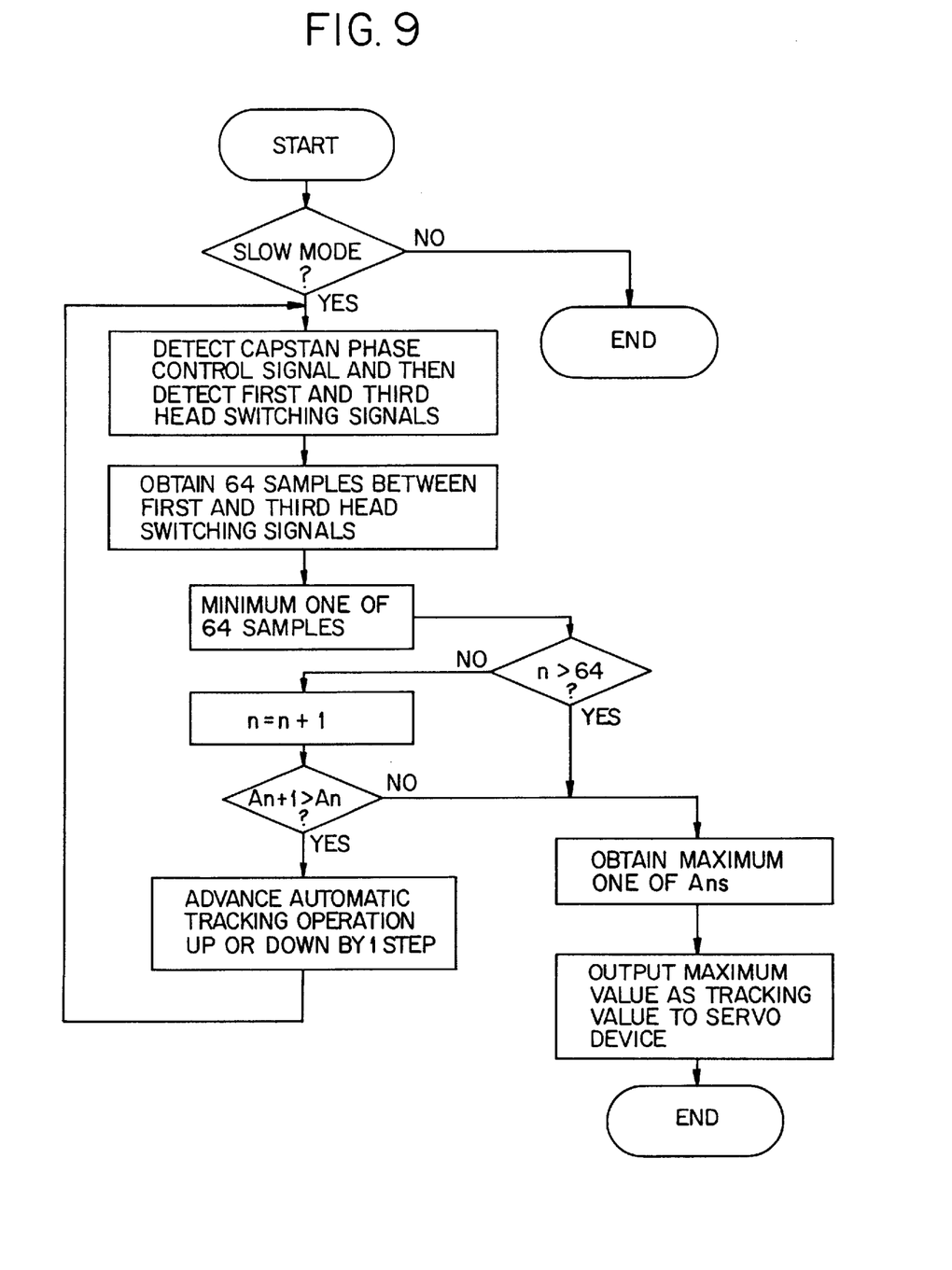
FIG. 9 is a flowchart illustrating a method of controlling tracking in a show mode playback in accordance with embodiments of the present invention.

Referring to FIG. 9, there is shown a flowchart illustrating a method of controlling the tracking in the slow mode playback in accordance with the present invention. First, it is checked whether a current playback mode is in the slow mode. If it is checked that the current playback mode is in the slow mode, the capstan phase control signal as shown by the reference numeral A in FIG. 6A is first detected and the first and third head switching signals as shown by the reference numerals B and C in FIG. 6B are then detected. Then, the envelopes of the video signal between the detected first and third head switching signals are sampled to obtain 64 samples. A minimum one of the obtained 64 samples as shown by the reference numerals D–G in FIG. 6C is stored as An. Then, the automatic tracking operation is advanced up or down by one step. The above procedure is again performed to obtain another minimum value An+1. The obtained minimum values An and An+1 are compared with each other. If the minimum value An+1 is greater than the minimum value An, the above procedure is repeatedly performed. On the contrary, if the minimum value An+1 is not greater than the minimum value An, the automatic tracking operation is stopped and a maximum one of the minimum values An in that procedure is outputted as the tracking value to the servo device 400. In this case, the tracking value to the servo device 400 is the optimal tracking point in the slow mode playback. FIGS. 6A to 6D are waveform diagrams of the signals at the optimal slow mode playback state obtained by the above procedure in accordance with the present invention, FIGS. 7A to 7D are waveform diagrams of the signals in the interval D of FIGS. 5A to 5D in accordance with the present invention under the condition that a noise is generated on an upper portion of a screen, and FIGS. 8A to 8D are waveform diagrams of the signals in the interval D of FIGS. 5A to 5D in accordance with the present invention under the condition that the noise is generated on a lower portion of the screen.

As apparent from the above description, according to the present invention, the noise resulting from the tracking error is automatically controlled in the slow mode playback with no manual operation of the user. Therefore, the optimal picture state can be obtained.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling tracking in a slow mode playback which includes a normal-speed playback and a still-mode playback performed alternatively, said apparatus comprising:

video signal processing means for detecting envelopes of a video signal detected from a video head;

control means for outputting servo data and a slow tracking signal by calculating an optimal interval of the slow tracking signal in response to the detected envelopes from said video signal processing means, during said slow mode playback;

servo means for outputting a capstan phase control signal in response to the servo data from said control means; and driving means for driving a capstan in response to the capstan phase control signal from said servo means combined with the slow tracking signal from said control means, wherein said control means includes, a data discriminating/processing unit for summing the envelopes of the video signal from said video signal processing means for a predetermined period, comparing the sum of the envelopes with a previous sum of envelopes of a previous video signal, and calculating slow tracking data in accordance with the comparison result, a slow tracking compensator for compensating the slow tracking data from said data discriminating/processing unit, and a slow tracking data storage unit for storing the slow tracking data compensated by said slow tracking compensator.

2. The apparatus of claim 1, wherein said control means calculates the optimal tracking interval by subtracting an initial tracking value in a normal playback mode from a tracking value changed in the normal playback mode and adding a value resulting from the subtraction to an initial slow tracking value.

3. The apparatus of claim 1, wherein said data discriminatory processing unit calculates the optimal tracking interval of the slow tracking signal if a difference between the sum and the previous sum is greater than a predetermined value.

4. The apparatus of claim 3, wherein said calculation means calculates the optimal tracking interval X according to the following equation:

$$X=Si+(Pc-Pi),$$

wherein Si is an initial slow tracking value, Pc is a tracking value changed in a normal playback mode, and Pi is an initial tracking value in the normal playback mode.

5. The apparatus of claim 1, wherein said control means further includes:

a servo controller for outputting a control signal for controlling said driving means in response to the slow tracking data, a servo data output unit for outputting the servo data to said servo means in response to the control signal from said servo controller, and a slow tracking signal output unit connected to said servo controller for outputting the slow tracking signal to said driving means in response to the control signal from said servo controller.

6. The apparatus of claim 1, wherein when the optimal tracking interval is lapsed, the still-mode playback begins.

7. A method of controlling tracking in a slow mode playback which includes a normal-speed playback and a still-mode playback performed alternatively, said method comprising the steps of:

summing envelopes of a video signal for a predetermined period;

comparing the sum of the envelopes with a previous sum of envelopes of a previous video signal to calculate slow tracking data;

calculating, during said slow mode playback, an optimal tracking interval of a slow tracking signal in accordance with the compared result to control tracking in the slow mode playback; and compensating the slow tracking data and storing the compensated slow tracking data to be used in said calculating step.

8. The method of claim 7, wherein said step of calculating includes steps of subtracting an initial tracking value in a normal playback from a tracking value changed in the normal playback and adding a value resulting from the subtraction to an initial slow tracking value.

9. The method of claim 8, wherein the optimal tracking interval of the slow tracking signal is calculated if a difference between the sum and the previous sum is greater than a predetermined value.

10. The method of claim 9, further comprising:

the step of controlling a capstan in accordance with the slow tracking signal.

11. The method of claim 7, wherein said still-mode playback begins when the optimal tracking interval is lapsed.

12. An apparatus for controlling tracking in a slow playback which includes a normal-speed playback and a still-mode playback performed alternatively, said apparatus comprising:

detection means for detecting for a predetermined period envelopes of a video signal recorded on a recording medium;

processing means for summing the detected envelopes of the video signal, comparing the sum of the detected envelopes with a previous sum of envelopes of a previous video signal, determining a tracking value corresponding to a maximum envelope point of the detected envelopes based on the comparison result, and generating a slow tracking signal using the determined tracking value, said processing means calculating an optimal tracking interval of the slow tracking signal during said slow playback; and servo means for controlling a capstan in response to the generated slow tracking signal, wherein the processing means includes, a data discriminating/processing unit for summing the detected envelopes of the video signal from the detection means, and comparing the sum of the detected envelopes with the previous sum of the envelopes of the previous video signal to calculate slow tracking data, a slow tracking compensator for compensating the slow tracking data from the data discriminating/processing unit, and a slow tracking data storage unit for storing the slow tracking data compensated by the slow tracking compensator.

13. The apparatus of claim 12, wherein said processing means calculates the optimal tracking interval of the slow tracking signal by subtracting an initial tracking value in a normal playback from the determined tracking value and adding a value resulting from the subtraction to an initial slow tracking value.

14. The apparatus of claim 13, wherein the optimal tracking interval of the slow tracking signal is calculated if a difference between the sum and the previous sum is greater than a predetermined value.

15. The apparatus of claim 13, further comprising:

storage means for storing the initial tracking value in the normal playback, which is accessible by said processing means.

16. The apparatus of claim 13, further comprising:

output means for generating a capstan phase control signal which is combined with the slow tracking signal generated by said processing means so as to control the capstan.

17. The apparatus of claim 13, further comprising:

a playback tracking data storage unit for storing normal tracking data, which are accessible by said processing means, said processing means controlling tracking in the normal-speed playback.

18. The apparatus of claim 13, wherein said slow tracking data is compensated, before being stored in said slow tracking data storage unit, by being compared with the initial slow tracking value.

19. The apparatus of claim 13, wherein said detection means includes a video signal processing circuit for processing the video signal recorded on the recording medium.

20. The apparatus of claim 12, wherein said predetermined period is a period of a head switching signal.

21. The apparatus of claim 12, wherein the still-mode playback begins when the optimal tracking interval is lapsed.

22. An apparatus for controlling tracking in slow mode playback, comprising:

video signal processing means for detecting envelopes of a video signal detected from a video head;

control means for outputting servo data and a slow tracking signal by calculating an optimal interval of the slow tracking signal in response to the detected envelopes from said video signal processing means;

servo means for outputting a capstan phase control signal in response to the servo data from said control means; and driving means for driving a capstan in response to the capstan phase control signal from said servo means combined with the slow tracking signal from said control means, wherein said control means calculates the optimal tracking interval by subtracting an initial tracking value in a normal playback mode from a tracking value changed in the normal playback mode and adding a value resulting from the subtraction to an initial slow tracking value.

23. A method of controlling tracking in slow mode playback, comprising the steps of:

summing envelopes of a video signal for a predetermined period;

comparing the sum of the envelopes with a previous sum of envelopes of a previous video signal; and calculating an optimal tracking interval of a slow tracking signal in accordance with the compared result to control tracking in the slow mode playback, wherein said step of calculating includes steps of subtracting an initial tracking value in a normal playback from a tracking value changed in the normal playback and adding a value resulting from the subtraction to an initial slow tracking value.

24. A device for controlling tracking in slow playback, comprising:

detection means for detecting for a predetermined period envelopes of a video signal recorded on a tape;

processing means for summing the detected envelopes of the video signal, comparing the sum of the detected envelopes with a previous sum of envelopes of a previous video signal, determining a tracking value corresponding to a maximum envelope point of the detected envelopes based on the comparison result, and generating a slow tracking signal using the determined tracking value; and servo means for controlling a capstan in response to the generated slow tracking signal, wherein said processing means calculates the optimal tracking interval of the slow tracking signal by subtracting an initial tracking value in a normal playback from the determined tracking value and adding a value resulting from the subtraction to an initial slow tracking value.

* * * * *